INVENTOR
JEAN L. REUTTER

Oct. 25, 1955  J. L. REUTTER  2,721,453
SYNCHRONOUS OSCILLATING COMPRESSOR FOR ALTERNATING CURRENT
Filed Jan. 30, 1953  2 Sheets-Sheet 2
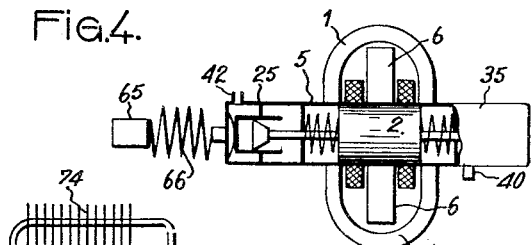
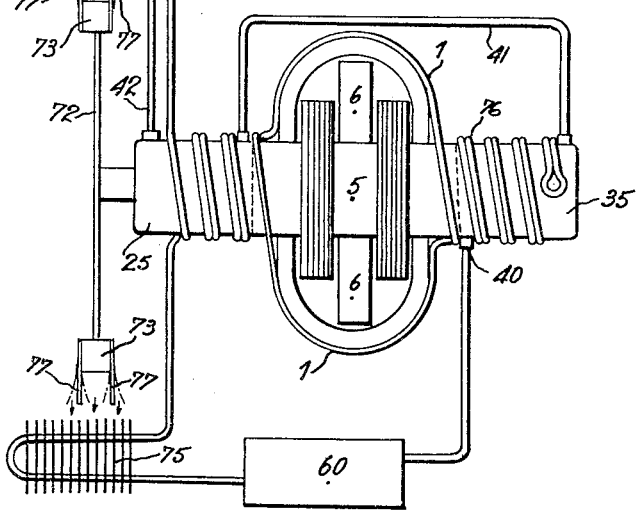
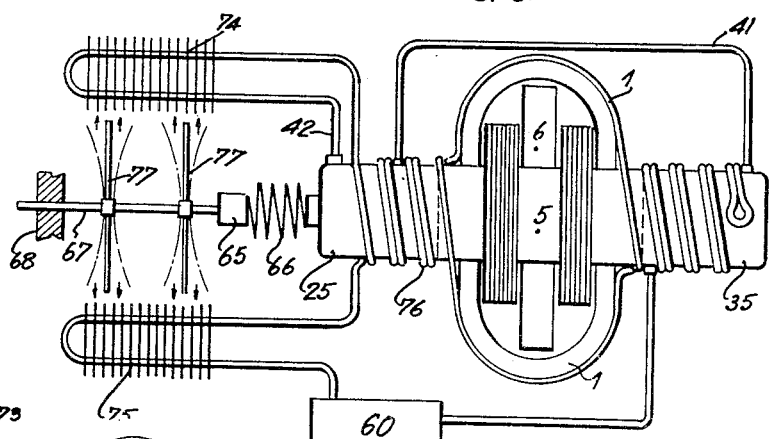
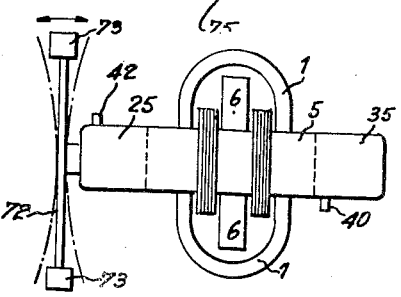
INVENTOR
JEAN L. REUTTER United States Patent Office 2,721,453
Patented Oct. 25, 1955

2,721,453

SYNCHRONOUS OSCILLATING COMPRESSOR FOR ALTERNATING CURRENT

Jean Leon Reutter, Geneva, Switzerland

Application January 30, 1953, Serial No. 334,161

12 Claims. (Cl. 62—115)

The present invention has, as an object, a synchronous oscillating compressor for alternating current, of low power applicable particularly to household refrigerating appliances.

The arrangements adopted in the compressor which is an object of the invention aim at:

1. Ensuring a high electro-mechanical efficiency and a high power factor;

2. Avoiding the de-magnetizing of permanent magnets should the alternating power supply current exceed the rated values.

3. Making it possible to modify, during the operation of the compressor, the natural oscillation frequency of the movable equipment, thus allowing at least an approximate maintenance, in all operating conditions of the compressor, this natural frequency equal to that of the alternating power supply current.

4. Avoiding the necessity of placing the compressor in a sealed chamber, due to the fact that no movable part goes through a wall separating the atmosphere from a chamber containing compressed gas.

5. Making it possible, at will, to realize one or two compression stages by merely placing in series or in parallel the two compression cylinders.

6. Avoiding that stray vibratory phenomena be transmitted to the supporting elements for the compressor and/or to the ducts to which it is connected.

These various aims are reached in the compressor which is an object of the invention due to the fact that it comprises a magnetic circuit offering two branches forming a closed O, a cylindrical casing made of a non magnetic material closed at its two ends and going through the magnetic circuit completely, a driving movable assembly comprising a core arranged inside the envelope and displaceable between the two poles of the magnetic circuit formed at the intersections of the latter with the envelope, an excitation winding to be supplied with alternating current and generating an alternating magnetic flux going through the core and closing through the two branches of the magnetic circuit, at least two permanent magnets arranged symmetrically on both sides of the envelope and generating magnetic fluxes closing through the core and creating at the two ends thereof poles of the same signs, and finally adjustment means making it possible to modify, during the operation of the compressor, the value of the natural frequency of oscillation of the movable assembly.

According to another feature of the invention, the compressor is provided with at least one elastic system associated with at least one mass, and the natural frequency of which is close to the oscillation frequency of the movable assembly.

The appended drawing shows, diagrammatically and by way of example a form of embodiment of the motor-compressor assembly.

Figure 4 is a diagrammatic sectional elevation illustrating another type of embodiment.

Figure 5 is a diagrammatic sectional elevation illustrating a modification of Figure 4.

Figure 6 is a side elevation to a larger scale, of another modification.

Figure 7 is a side elevation, similar to Figure 6 illustrating a modification.

Figures 1, 2, 3:
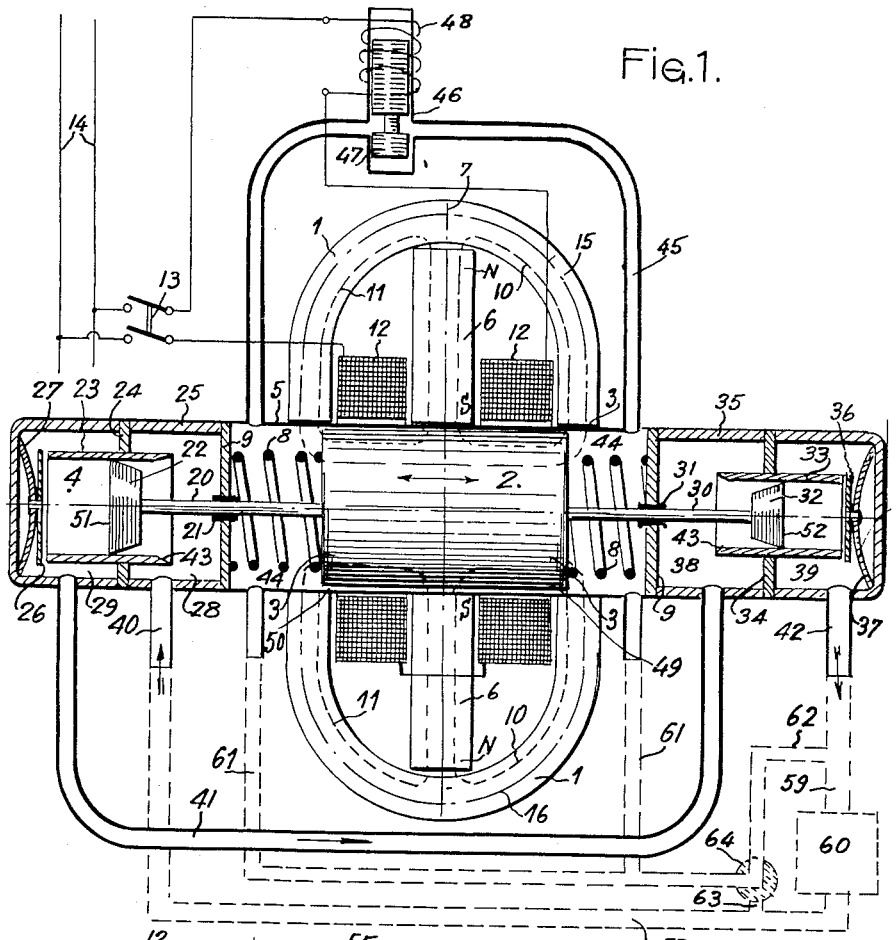
Figure 1 is a view in axial section of a first type of embodiment.
Figure 2 is a view in plan, at a smaller smale, of a second type of embodiment.
Figure 3 is a side view.

According to the type of embodiment shown in Figure 1 of the appended drawing, the motor-compressor assembly comprises a motor actuating a two-stage compressor.

The motor comprises a magnetic circuit offering a fixed portion 1, of dynamolaminations stacked together, and a core or shuttle 2. The fixed portion 1 of the magnetic circuit offers two branches forming a closed O (Figure 1). This fixed portion comprises two circular apertures 3, made along the horizontal axis 4 of the O, and in which is engaged a cylindrical envelope 5, the very thin walls of which (a few tenths of one millimeter) are of nonmagnetic metal and offer a high electrical resistivity (of the order of 80 micro-ohm-cm.). Two permanent magnets 6 are arranged on both sides of the casing 5 in the plane of symmetry 7 of the O formed by the magnetic circuit, perpendicular to the axis 4 of the cylindrical envelope 5. Their poles S are in contact with the side walls of the envelopes 5 while their poles N are in contact with the magnetic circuit. The core or shuttle 2 slides inside the envelope 5 and its axial position is defined by two return springs 8 bearing on the end walls 9 of the cylindrical envelope 5. In addition, the magnetic fluxes generated by the permanent magnets 6 close along the paths 10 and 11; the core automatically assumes an equilibrium position for which the magnetic resistances of the circuits 10 and 11 are equal. This condition is obtained when the core occupies a position symmetrical (Figure 1) with respect to the vertical axis 7 of the O formed by the fixed magnetic circuit 1. A winding 12 surrounding the cylindrical envelope 5 and housed on both sides of the permanent magnets 6, is connected through a cut-off switch 13 to a distribution main 14 supplying alternating current. This winding 12 also generates two alternating magnetic fluxes each one of them passing through one half of the magnetic circuit along the paths 15 and 16 and both closing through the core 2.

Each end of the core 2 carries a rod 20, 30 sliding through a gland 21, 31 and each one of them going through one of the end walls 9. Each rod 20, 30 carries a piston 22, 32, sliding inside a compression cylinder 23, 33, open at its two ends and carried by a wall 24, 34 attached to a casing 25, 35 carried by each end wall 9. The ends of the cylinders 23, 33 opposite the core 2, are stopped, each one of them, by a valve 26, 36, subjected to the action of a spring 27, 37, bearing on the bottom of each casing 25, 35. The wall 24 divides the casing 25 into two chambers 28 and 29, while the wall 34 divides the casing 35 into two chambers 38 and 39.

The chamber 28 is connected, through a suction conduit 40, with the atmosphere or, as indicated in dotted lines, with the low pressure circuit 58 of a refrigerating appliance. The chambers 29 and 38 are connected with each other through a conduit 41 and the chamber 39 is provided with a conduit 42 for delivery and forcing. The latter may, as shown in dotted lines, be connected with a high pressure circuit 59 supplying with compressed air a receiver, for example an expander or a refrigerator 60 of a refrigerating cabinet. The ends of the compression cylinders 23 and 33 opening respectively in the chambers 28 and 38 both offer a conical entrance 43. The chambers 44, having a variable volume, limited by the front faces of the core 2 and the end walls of the envelope 5, are connected together by a transfer conduit 45, provided with an adjustment device 46 for its delivery. This device, shown schematically in Figure 1, consists, in the type of embodiment represented, in an electromagnetic valve, in which the position of the stopping element 47 may be modified and fixed by a variation of the power supply voltage of the excitation winding 48.

In the modification shown in dotted lines in Figure 1, the chambers 44 may be connected through conduits 61, 62, 63, and a multiple way valve 64 on the one hand with the high pressure circuit 59 supplying the refrigerator 60, and, on the other hand with the low pressure circuit conduit 58.

The operation of the above-described compressor, with reference to Figure 1 is as follows:

At the rest position, the core 2 occupies the position shown in Figure 1, for which the magnetic circuits 10 and 11 offer equal magnetic resistances. Upon the closing of the switch 13, the winding 12 is supplied with alternating current. Consequently, during a first half period, the winding 12 generates a magnetic flux in the core 2, which closes through the two branches of the magnetic circuit along the paths 15 and 16. This magnetic flux adds, for example, in the air gap 49 to the fluxes generated by the permanent magnets 6 and subtracts from the latter in the air gap 50. There results an unbalance in the forces of magnetic attraction acting on the ends of the core 2 and a displacement of the latter towards the right in Figure 1. During the next half period, of the alternating current supplying the winding 12, the magnetic flux generated by the latter is reversed, so that the core 2 is pulled towards the left in the drawing. Thus the alternating current supplying the winding 12 tends to drive this core 2 in a rectilinear oscillatory motion, the frequency of which is equal to that of said alternating current.

When the core is at its extreme right hand position, the plane of the face 51 of the piston 22 is located in the conical entrance 43 to the cylinder 23, so that gas may penetrate inside the latter. During the displacement of the core 2 in the opposite direction, to its extreme left hand position, the piston 22 compresses the gas introduced into the cylinder 23. Under the action of the gas pressure, the valve 26 rises and the gas is forced into the chamber 38 through the conduit 41. When the core 2 is at its extreme left hand position, the plane of the face 52 of the piston 32 is located inside the conical entrance 43 to the cylinder 33. Some gas therefore, enters the latter and during the next run of the core 2 to its extreme right hand position, the gas is compressed in this cylinder 33 a second time. Under the action of the gas pressure, the valve 36 rises and this compressed gas is forced through the conduit 42.

In order to obtain an important amplitude of the motion of the core, it is necessary that the natural oscillation frequency of the whole movable assembly comprising the core 2, the rods 20 and 30 and the pistons 22 and 32 be approximately equal to the frequency which the power supply alternating current to the winding 12 tends to impose on this movable assembly. When these two frequencies are equal, the assembly resonates and the electro-magnetic efficiency reaches a maximum, as well as the power factor.

It will be seen, from an examination of the appended drawing that the natural frequency of this movable assembly is a function of the volumes 44 if the latter are sealed tight, of the pressures obtaining in these volumes, of the characteristics of the springs 8 and of the pressures obtaining inside the cylinders 23 and 33.

By providing a sufficiently small clearance between the core 2 and the cylindrical envelope 5, it is easily possible to obtain a sufficient tightness of these chambers 44 to have an elastic compression of the gas contained therein, so that the action of this gas adds on the core to that of the springs. Then the volumes of these chambers 44 and the average pressures obtaining therein act on the values of the natural oscillation frequency of the movable assembly and it is possible to modify and adjust the value of this frequency by modifying the pressure obtaining inside said chambers.

Thus the desired natural frequency is obtained at will by connecting the chambers 44 through the conduits 61, 62, 63, and the valve 64 either to the low pressure in the appliance or to the high pressure. These chambers 44 could also be connected with a portion of the circuit in which an intermediate pressure obtains.

Another means of adjustment is given by the valve 46. When the latter is open, no pressure variation can take place during the motion of the core 2, in the chambers 44, the pressure equilibrium being effected through the transfer conduit 45. The value of the natural frequency of the movable assembly is then a minimum. As the valve 46 closes, the compression rate increases in the chambers 44 and the natural frequency of the movable assembly increases to an optimum value. These two adjustment methods, by varying the mean pressure in the chambers 44 and by a gradual opening of the valve 46 may be used separately or simultaneously.

By connecting the winding 48 in series with the winding 12, as shown at 1, Figure 1, an automatic adjustment is obtained of the natural oscillation frequency of the movable assembly. When that frequency is lower than that of the alternating current, the power necessary for the operation of the compressor is relatively high and therefore the current flowing through the winding 48 is relatively large. Consequently, the stopping element 47 is attracted against the action of its return spring and tends to cut the connection between the chambers 44. Due to this fact, the mean pressure in these chambers increases, which causes an increase in the natural frequency of the movable assembly. When the frequency of the latter is tuned to that of the power supply mains, the power drawn reaches a minimum and the opening of the electromagnetic valve a maximum. To obtain a stable automatic adjustment, it is advantageous to manage so that the natural oscillation frequency of the movable assembly can never reach the frequency of the supply mains, but approaches it sufficiently so that in practice, the movable assembly starts resonating.

The control of the valve 46 may be effected through other means, for instance by means of a rheostat actuated manually or automatically.

In the type of embodiment according to Figures 2 and 3, the construction of the compressor is exactly similar to that described above, except as regards the shape and arrangement of the magnetic circuit and permanent magnets. In this second form of embodiment, the magnetic circuit consists of two flanges 54, of laminated sheets through which passes the cylindrical envelope 5 and connected through two yokes 55. The permanent magnets 6, horse-shoe shaped, are four in number and arranged on both sides of the envelope 5, symmetrically with respect to a diametral plane 56, itself perpendicular on the diametral plane 57 of symmetry of the magnetic circuit. These four permanent magnets are placed in opposition to one another in such a manner as to obtain, at the two ends of the core 2, poles of the same designation as described with reference to Figure 1. Their four branches, carrying poles S are located in the plane of symmetry of the magnetic circuit, perpendicular on the axis of the cylindrical envelope 5 and their four branches carrying the poles N are located in planes containing the flanges 54 of the magnetic circuit.

From the above and from an examination of the appended drawing, it is easy to realize that the possibility of modifying over a very large range the value of the natural oscillation frequency of the movable assembly of the compressor makes it possible to ensure a high electro-mechanical efficiency and a high power factor.

It will be seen that the magnetic flux generated by the winding 12 does not go through the permanent magnets but closes through the two branches of the magnetic circuit forming an O. Thus there is no risk of demagnetizing these permanent magnets.

In addition, the construction described makes it possible to obtain a compact assembly which may easily be made tight, which eliminates the necessity of providing a tight envelope. The tightness of the whole is all the more easy to obtain as the movable elements of the assembly only go through inner walls of the envelope 5 or inner walls of the casings 25 and 35.

In addition, the two compression cylinders of the compressor described can be connected in series as described with reference to Figure 1 so as to realize a two-stage compressor, but the conduit 41 may also be omitted and the two compression cylinders connected in parallel or each one of them may be supplied through a distinct utilization circuit.

It is obviously advantageous to decrease as much as possible the frictions in the movable assembly. To this effect, the permanent magnets 6 are arranged on both sides of the envelope 5 along the same diametral plane and are chosen with equal powers, so that the actions exerted by them on the core 2 cancel and the core remains "floating" in the axis of the cylindrical envelope 5.

With a view to decreasing the vibrations transmitted to the frame carrying the compressor, there can be mounted, on the same frame, two compressors as described above, by arranging them on one axis and by connecting their windings 12 in such a manner that the two movable assemblies oscillate in phase opposition; this solution is costly, however, since it requires two identical compressors.

Figures 4 to 7 show, by way of examples, a compressor such as the one described above, comprising suitable means for preventing the transmission of vibrations to outside elements such as inlet and outlet fluid conduits and/or to the support of the compressor.

According to Figure 4 of the appended drawing, the oscillating motor carries a mass 65 attached through a spring 66 with one end of the cylindrical protection formed by the envelope 5 and the two casings 25 and 35.

When the motor operates and the shuttle 2 oscillates at the frequency of the alternating power supply, the mass 65 is carried along in the oscillatory motion of the shuttle.

Thus the mass 65 and its spring 66 on one hand and the movable assembly subjected to the elastic actions of the gas and its return springs, on the other hand, behave like the two branches of a tuning fork. A vibratory motion imparted to one branch of a tuning fork is immediately communicated to the other branch with a phase shift of 180° and a motion equilibrium occurs, such that its middle portion remains motionless. In the case considered here, the middle portion, connecting the two oscillating systems, is constituted by the body or stationary portion of the motor-compressor formed by the envelope 5 carrying the casings 25 and 35, the magnets 6 and the electro-magnets 1. Consequently, the result aimed at is reached since the tubes 42 and 40, connected into a refrigerating circuit are no longer carried along in the oscillating motion of the shuttle 2.

In the form of embodiment shown in Figure 5, the elastic system consists of a spring blade 72, the middle portion of which is attached to one end of the cylindrical protection formed by the envelope 5 and the casings 25 and 35. Each end of this spring 72 carries a mass 73. The values of these masses and the elastic characteristics of the two portions of the spring 72 are chosen in such a manner that this assembly: elastic elements-mass, offers a natural oscillation frequency close to that of the alternating current supplying the electro-magnets 1.

The operation of this form of embodiment is exactly similar to that described above in connection with Figure 4.

Figure 6 illustrates a modified embodiment of the compressor shown in Figure 4, wherein the rod 67 carries two vibrating elastic blades 77, the oscillating frequency of which, as free ended blades, is tuned to or at least close to the frequency of the alternating-current supplying the electro-magnet 1. Opposite the ends of the vibrating blades radiators or condensers 74, 75 are arranged, provided with fins, inserted in the refrigerating circuit. The condenser 74 connected on the delivery conduit is connected with the condenser 75 through a cooling circuit 76 in metallic or thermal contact with the fixed portions of the compressor.

When the motor is energized, the oscillating motion of the shuttle causes a vibration of the flexible blades 77, which may have a large amplitude. These blades behave like wings or fans, setting up an air draught. The air draughts thus caused go through the condensers 74 and 75. The liquid condensed in the condenser 74 circulates in the conduit 76, in thermal contact with the fixed metal portions of the compressor. The calories produced by the compression Joule effect and hysteresis losses, eddy currents, etc. are removed by evaporation of the liquid circulating in the conduit 76 so that all portions of the compressor are cooled, in an efficient manner, provided care is taken to connect thermally the various portions of the body of the compressor together. After going through said conduit 76 and cooling the compressor intensely, the fluid flows through the condenser 75 in which it is finally liquefied before being expanded in the evaporator 60 for producing cold.

The modified embodiment shown in Figure 7 is similar to that described above with reference to Figure 6, the vibrating blades 77 are carried by slugs 73, attached at the ends of flexible blades 72 similar to those described with reference to Figure 5.

According to another modification, not shown, an assembly consisting of elastic elements and slugs is attached to each one of the ends of the cylinder formed by the envelope 5 provided with its casings 25 and 35.

The invention is not limited to the examples of embodiment described in detail, as various modifications may be made thereto within its scope. In particular, the springs and elastic blades such as the springs 66 or the blades 72, 77 may be replaced by any other equivalent elastic element.

I claim:

1. In an electromagnetically operated pump particularly for refrigerating apparatus, the combination of a thin cylindrical envelope, a magnetic circuit including two pole pieces of the same polarity and connected to said envelope, permanent magnets between said pole pieces and in contact with said magnetic circuit and said cylindrical envelope, alternating electrically energized coil windings between said pole pieces and said permanent magnets and adapted to produce an alternating field of constant frequency, a magnetic core constituting a shuttle within said cylindrical envelope, said shuttle having a length chosen so that its ends are partly engaged between said two pole pieces when the pump is in non-operation, cylindrical casings secured at each end of the cylindrical envelope and closing the latter completely, compressing members mounted in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

2. In an electromagnetically operated pump, particularly for refrigerating apparatus, the combination of a thin non-magnetic cylindrical envelope having an electric resistivity of the order of 80 micro-ohm-cm., a magnetic circuit including two cylindrical pole pieces fitted on said envelope and magnetic parts connecting said pole pieces, permanent magnets having their pole pieces of the same polarity opposite one the other, said permanent magnets being located between said circuit pole pieces so that said later pole pieces have polarities opposite to the polarity of the magnet pole pieces, alternating electrically energized coil windings between said circuit pole pieces and the permanent magnets and being adapted to produce an alternating field of constant frequency, a magnetic core constituting a shuttle within said cylindrical envelope, said shuttle having a length chosen so that its ends are partly engaged between the two circuit pole pieces when the pump is in non-operation, cylindrical casings secured at each end of the cylindrical envelope closing the latter completely, compressing members in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

3. In an electromagnetically operated pump particularly for refrigerating apparatus, the combination of a thin cylindrical envelope, a magnetic circuit including two pole pieces of the same polarity and connected to said envelope, permanent magnets between said pole pieces and in contact with said magnetic circuit and said cylindrical envelope, alternating electrically energized coil windings between said pole pieces and the permanent magnets and adapted to produce an alternating field of constant frequency, a cylindrical magnetic core constituting a shuttle in said cylindrical envelope and having an outer diameter substantially equal to the inner diameter of the cylindrical envelope, said shuttle having its ends partially engaged between the pole pieces of the magnetic circuit, cylindrical casings secured at each end of the cylindrical envelope closing the latter completely, compressing members mounted in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

4. In an electromagnetically operated pump particularly for refrigerating apparatus, the combination of a thin non-magnetic cylindrical envelope having an electric resistivity of the order of 80 micro-ohm-cm., a magnetic circuit including two cylindrical pole pieces fitted on said envelope and magnetic parts connecting said pole pieces, permanent magnets having their pole pieces of the same polarity and opposite one the other, said permanent magnets being located between said circuit pole pieces so that said latter pole pieces have polarities opposite to the polarity of said magnet pole pieces, alternating electrically energized coil windings between said circuit pole pieces and said permanent magnets and adapted to produce an alternating field of constant frequency, a cylindrical magnetic core constituting a shuttle in said cylindrical envelope and having an outer diameter substantially equal to the inner diameter of said cylindrical envelope, said shuttle having its ends partially engaged between said circuit pole pieces, cylindrical casings secured at each end of the cylindrical envelope and closing the latter completely, compressing members mounted in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

5. In an electromagnetically operated pump particularly for refrigerating apparatus, the combination of a thin non-magnetic cylindrical envelope, a magnetic circuit including two cylindrical pole pieces fitted on said envelope and two magnetic parts connecting said pole pieces, rectangular permanent magnets adapted to produce a constant magnetic field and respectively connected to each one of said two magnetic parts and to the cylindrical envelope with the opposite ends of the permanent magnets of same polarity and said two pole pieces of opposite polarity to that of said opposite magnet ends, coil windings adapted to produce an alternating field and carried by said cylindrical envelope close to said pole pieces so that said field is successively in addition and in subtraction to the constant magnetic field of the permanent magnets in creating opposed polarities to each one of said pole pieces, a magnetic core constituting a shuttle in said cylindrical envelope, said shuttle having a length chosen so that its ends are partly engaged between said two pole pieces when the pump is in non-operation, cylindrical casings secured at each end of the cylindrical envelope and closing the latter completely, compressing members mounted in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

6. In an electromagnetically operated pump particularly for refrigerating apparatus, the combination of a thin non-magnetic cylindrical envelope, a magnetic circuit having two cylindrical pole pieces fitted on said envelope and two magnetic parts connecting said pole pieces, rectangular permanent magnets adapted to produce a constant magnetic field and respectively connected to each one of said two magnetic parts and to the cylindrical envelope with the opposite ends of the permanent magnets of same polarity and said two pole pieces of opposite polarity to that of said opposite magnet ends, coil windings adapted to produce an alternating field carried by said cylindrical envelope close to said pole pieces so that said field is successively in addition and in subtraction to the constant magnetic field of the permanent magnets in creating opposed polarities to each one of said pole pieces, a cylindrical magnetic core constituting a shuttle in said cylindrical envelope and having an outer diameter substantially equal to the inner diameter of said cylindrical envelope, said shuttle having its ends partially engaged between said pole pieces, cylindrical casings secured at each end of the cylindrical envelope closing the latter completely, compressing members mounted in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

7. In an electromagnetically operated pump particularly for refrigerating apparatus, the combination of a thin non-magnetic cylindrical envelope, a magnetic circuit having two pole pieces fitted on said envelope, said pole pieces being magnetically connected together, two permanent horse shoe magnets adapted to produce a constant magnetic field, said magnets having their pole pieces in contact with the cylindrical envelope and being disposed so that the pole pieces of the magnetic circuit are of same polarity, coil windings adapted to produce an alternating field and carried by said cylindrical envelope close to said circuit pole pieces so that said field is successively in addition and in subtraction to the constant magnetic field of the permanent magnets in creating opposed polarities to each one of said circuit pole pieces, a magnetic core constituting a shuttle in said cylindrical envelope, said shuttle having a length chosen so that its ends are partly engaged between said two circuit pole pieces when the pump is in non-operation, cylindrical casings secured at each end of the cylindrical envelope and closing the latter completely, compressing members mounted in said cylindrical casings and connected to said shuttle, spring loaded elements interposed between said shuttle and said casings so that the natural frequency of said shuttle is lower than but close to the frequency of said alternating field, and spring loaded means connected to the envelope for damping vibrations.

8. In an electromagnetically operated pump particularly for refrigerating apparatus, the combination of a thin cylindrical envelope, a magnetic circuit, including two pole pieces of same polarity and connected to said envelope, permanent magnets between said pole pieces so that said magnets are in contact with said magnetic circuit and said cylindrical envelope, alternating electrically energized coil windings between said pole pieces and the permanent magnets, said windings being adapted to produce an alternating field of constant frequency, a magnetic core constituting a shuttle in said cylindrical envelope, said shuttle having a length selected so that its ends are partly engaged between said two pole pieces when the pump is in non-operation, cylindrical casings secured at each end of the cylindrical envelope and closing the latter completely, a cylinder in each one of said casings, annular partitions carrying said cylinder and defining two chambers in each one of said casings, loaded valves closing one of the ends of each cylinder, pistons slidable in said cylinders, sliding supports connecting and carrying said shuttle and said pistons in going through one of the walls of the casing which offer holes, tightening elements constituting bearings in said holes in which are moved said sliding supports, spring loaded elements interposed between said shuttle and said casings so that the natural frequency of said shuttle is lower than but close to the frequency of said alternating field, and spring loaded means connected to the envelope to damp vibrations.

9. In an electromagnetically operated pump particularly for refrigerating apparatus, the combination of a thin cylindrical envelope, a magnetic circuit including two pole pieces of same polarity connected to said envelope, permanent magnets between said pole pieces and in contact with said magnetic circuit and said cylindrical envelope, alternating electrically energized coil windings between said pole pieces and the permanent magnets and adapted to produce an alternating field of constant frequency, a magnetic core constituting a shuttle in said cylindrical envelope, said shuttle having a length selected so that its ends are partly engaged between the two pole pieces of the magnetic circuit when the pump is in non-operation, cylindrical casings secured at each end of the cylindrical envelope and closing the latter completely, compressing members mounted in said cylindrical casings and connected to said shuttle, spring loaded elements interposed between said shuttle and said casings so that the natural frequency of said shuttle is lower than but close to the frequency of said alternating field, a spring connected to the end of one of said casings, and a mass associated to said spring, said mass and spring having a natural frequency equal to that of the alternating current energizing said coil windings whereby to damp vibrations.

10. In an electromagnetically operated pump particularly for refrigerating apparatus, the combination of a thin cylindrical envelope, a magnetic circuit including two pole pieces of the same polarity and connected to said envelope, permanent magnets between said pole pieces and in contact with said magnetic circuit and said cylindrical envelope, alternating electrically energized coil windings between said pole pieces and the permanent magnets and adapted to produce an alternating field of constant frequency, a magnetic core constituting a shuttle in said cylindrical envelope; said shuttle having a length selected so that its ends are partly engaged between said pole pieces when the pump is in non-operation, cylindrical casings secured at each end of the cylindrical envelope and closing the latter completely, compressing members mounted in said cylindrical casings and connected to said shuttle, spring loaded elements interposed between said shuttle and said casings so that the natural frequency of said shuttle is lower than but close to the frequency of said alternating field, at least one blade spring connected to one of said casings and having a natural frequency equal to that of the alternating current energizing said coil windings so that it oscillates in phase opposition but at the same frequency as that of said shuttle, and a condenser unit located close to said blade.

11. In an electromagnetically operated pump, particularly for refrigerating apparatus, the combination of a thin cylindrical envelope, a magnetic circuit including two pole pieces of the same polarity and connected to said envelope, permanent magnets between said pole pieces and in contact with said magnetic circuit and said cylindrical envelope, alternating electrically energized coil windings between said pole pieces and said permanent magnets and adapted to produce an alternating field of constant frequency, a magnetic core constituting a shuttle in said cylindrical envelope, said shuttle having a length selected so that its ends are partly engaged between said two pole pieces when the pump is in non-operation, cylindrical casings secured at each end of the cylindrical envelope and closing the latter completely, a cylinder in each of said casings, annular partitions carrying said cylinder and defining two chambers in each of said casings, loaded valves closing one of the ends of each cylinder, pistons sliding into said cylinder, sliding supports connecting and carrying said shuttle and said pistons in going through one of the walls of the casings which offer holes, tightening elements constituting bearings in said holes in which are moved said sliding supports, inlet ducts and outlet ducts opening into each one of the chambers in said casings, spring loaded elements interposed between said shuttle and said casings so that the natural frequency of said shuttle is lower than but close to the frequency of said alternating field, and spring loaded means connected to the envelope to damp vibrations.

12. An electromagnetically operated pump, according to claim 11, in which the outlet duct opening into one of the chambers in one casing is connected to the inlet duct opening into one of the chambers of the other casing.

References Cited in the file of this patent

UNITED STATES PATENTS

| Number | Name | Date |
|---|---|---|
| 494,956 | Johnson et al. | Apr. 4, 1893 |
| 1,572,126 | Bothner | Feb. 9, 1926 |
| 2,177,795 | Von Delden | Oct. 31, 1939 |
| 2,205,138 | Gould | June 18, 1940 |
| 2,257,862 | Sarver | Oct. 7, 1941 |
| 2,434,280 | Morain | Jan. 13, 1948 |
| 2,462,745 | Horgen | Feb. 22, 1949 |